(12) United States Patent
Yamanaka et al.

(10) Patent No.: US 7,033,472 B2
(45) Date of Patent: Apr. 25, 2006

(54) ELECTRODEIONIZATION WATER PRODUCING APPARATUS AND METHOD OF PRODUCING DEIONIZED WATER USING SAME

(75) Inventors: Koji Yamanaka, Tokyo (JP); Hiroshi Inoue, Tokyo (JP); Osamu Kawaguchi, Tokyo (JP); Masao Hidaka, Tokyo (JP); Yuya Sato, Tokyo (JP)

(73) Assignee: Organo Corporation, Tokyo (JP)

( * ) Notice: Subject to any disclaimer, the term of this patent is extended or adjusted under 35 U.S.C. 154(b) by 578 days.

(21) Appl. No.: 10/359,574

(22) Filed: Feb. 7, 2003

(65) Prior Publication Data

US 2003/0150732 A1    Aug. 14, 2003

(30) Foreign Application Priority Data

Feb. 8, 2002    (JP) ............................. 2002-032467

(51) Int. Cl.
*B01D 61/48*    (2006.01)

(52) U.S. Cl. ...................... 204/524; 204/533; 204/536; 204/632; 204/633

(58) Field of Classification Search ................ 204/524, 204/533, 536, 632, 633
See application file for complete search history.

(56) References Cited

U.S. PATENT DOCUMENTS 6,274,018 B1    8/2001    Hidaka

FOREIGN PATENT DOCUMENTS

JP    2001-225078    8/2001
WO    WO 98/51620    * 11/1998

* cited by examiner

*Primary Examiner*—Arun S. Phasge
(74) *Attorney, Agent, or Firm*—Oblon, Spivak, McClelland, Maier & Neustadt, P.C.

(57) ABSTRACT

The electrodeionization water producing apparatus comprising a depletion chamber packed with an ion exchange material, the depletion chamber being partitioned by a cation exchange membrane on one side and an anion exchange membrane on the other side, and concentrate chambers installed on both sides of the depletion chamber with the cation exchange membrane and the anion exchange membrane disposed inbetween, the depletion chamber and the concentrate chambers disposing between an anode chamber equipped with an anode and a cathode chamber equipped with a cathode, wherein the concentrate chambers are packed with an organic porous ion exchange material having a continuous pore structure in which the wall made from interconnected macropores contains mesopores with an average diameter of 1 to 1,000 μm. The apparatus ensures reduction of electric resistance and does not form scale in the concentrate chamber during long continuous operation.

18 Claims, 7 Drawing Sheets

ELECTRODEIONIZATION WATER PRODUCING APPARATUS AND METHOD OF PRODUCING DEIONIZED WATER USING SAME

BACKGROUND OF THE INVENTION

1. Field of the Invention

The present invention relates to a power saving, scale free-type electrodeionization water producing apparatus used in various industrial facilities and research facilities in the fields of semiconductor manufacturing, pharmaceuticals, atomic power and steam power generations, food industries, and the like, and to a method of producing deionized water using the same.

2. Description of Background Art

As a method of producing deionized water, a method of passing the water to be processed through ion exchange resins has conventionally been known. This method, however, requires regeneration of the ion exchange resins with chemicals when the ion exchange resins have been saturated with impurity ions. To overcome this operational disadvantage, an electrodeionization water producing method that does not require regeneration with chemicals has been established and put into practice.

The electrodeionization water producing apparatus has a depletion chamber partitioned by a cation exchange membrane on one side and an anion exchange membrane on the other side. The depletion chamber is packed with an ion exchange material. Concentrate chambers are provided on both sides of the depletion chamber with the cation exchange membrane and the anion exchange membrane in-between. The depletion chamber and the concentration chambers are disposed between an anode chamber having an anode and a cathode chamber having a cathode. Water to be processed is supplied to the depletion chamber while applying a voltage. Concentrate water is sent to a concentrate chamber to remove impurity ions from the water to be processed, whereby deionized water is produced.

In recent years, instead of a conventional electro deionization water producing apparatus, in which cation exchange membranes and anion exchange membranes, separated from one another, are alternately arranged and an ion exchange material is filled in every other chamber formed by the cation exchange membrane and anion exchange membrane, thereby forming a depletion chamber, an improved electrodeionization water producing apparatus with a radically remodeled depletion chamber has been developed (Japanese Patent Application Laid-open No. 2001-239270). This improved electrodeionization water producing apparatus includes two small depletion chambers filled with an ion exchange material, this two-chamber depletion chamber formed by a space partitioned by a cation exchange membrane on one side and an anion exchange membrane on the other side, and an intermediate ion exchange membrane disposed between the cation exchange membrane and the anion exchange membrane. Concentrate chambers are provided on both sides of the depletion chamber with the cation exchange membrane and the anion exchange membrane disposed inbetween. The two-chamber depletion chamber and the concentration chambers are disposed between an anode chamber having an anode and a cathode chamber having a cathode. Water to be processed is supplied to one of the small depletion chambers while applying a voltage. The water flowing out of the small depletion chamber is sent to the other small depletion chamber. Concentrate water is sent to the concentrate chamber to remove impurity ions from the water to be processed, whereby deionized water is produced. In the electrodeionization water producing apparatus of this structure, at least one small depletion chamber of the two small depletion chambers may be filled with only one ion exchange material, e.g. an anion exchange material or cation exchange material, or may be filled with a mixture of the anion exchange material and cation exchange material. This makes it possible to reduce the electric resistance according to the type of ion exchange material used and to provide an optimum thickness to obtain high removal performance for silica or carbonic acid, which has not been achieved by conventional electrodeionization water producing apparatuses.

However, since the electric resistance of the concentrate chamber is large in the conventional electrodeionization water producing apparatuses, a rated current requires a high voltage to pass through the concentrate chamber, resulting in a large power consumption. Since regeneration using chemicals is unnecessary as mentioned above, the operation cost for the electrodeionization water producing apparatus is determined by the amount of electric power consumption. If a rectification loss incurred during conversion of AC current into DC current is excluded, the electric power consumption is equal to the DC current between the electrodes multiplied by voltage.

The DC current is determined by the amount and type of ions in the water to be processed and quality required for processed water. In an electrodeionization water producing apparatus, ions adsorbed on ion exchange materials in the depletion chamber must be continuously discharged to the concentration water side by electrophoresis. Supply of current sufficient to move ions is essential for an electrodeionization water producing apparatus to properly exhibit its performance. Therefore, a fixed current operation, in which a prescribed level of current value above the minimum current value necessary for the operation is maintained, is usually adopted for an electrodeionization water producing apparatus. Hence it is impossible to save power consumption by reducing this prescribed level of current value.

On the other hand, the voltage is a sum of electric potentials created by electric resistances of the electrode chambers, concentrate chambers, and depletion chambers disposed between both of the electrodes, and the ion exchange membranes separating them. The voltage thus depsides upon the performance of the ion exchange materials and ion exchange membranes forming these depletion chambers, types of counter ions, and type and amount of ions contained in the chamber water, and the like. Among these, the electric resistance of the concentrate chambers is significant as compared with other structural components of the electrodeionization water producing apparatus. Specifically, not only is the electrode chamber usually provided only at each end of the electrodeionization water producing apparatus, but also its internal ion strength is comparatively high. A plural number of ion exchange membranes and depletion chambers are usually disposed between the electrodes. However, since the ion exchange membranes are electro-conductive solids each having ion exchange groups and the depletion chamber also has an electro-conductive solid (ion exchange material) filled therein, these components have comparatively small electric resistance. In contrast, the concentrate chambers are also disposed in plural numbers between the two electrodes and in the conventional electrodeionization water producing apparatuses, the concentrate chambers are not filled with conductive materials. Therefore, the conductivity of the concentrate chambers depsides only on the ions possessed by the chamber water, giving rise to a high electric resistance. This has become a major factor of an increase in the overall electric resistances of the apparatus.

In addition, the conventional electrodeionization water producing apparatuses have a problem of forming scale such as calcium carbonate and magnesium hydroxide in the concentrate chamber when the water to be processed has a high hardness. If scale is formed, the electric resistance increases in the scaled part, resulting in decreased current flow. To cause the current to flow in a quantity equivalent to that flowed when there is no scale, the voltage must be increased, thereby increasing the power consumption. In addition, the current density varies according to the scaled area in the concentrate chamber, which leads to a non-uniform current in the depletion chamber. If the deposits of scale increase further, the pressure difference of flow is elevated, followed by a further increase in the voltage. The current decreases when the voltage exceeds the maximum voltage value for the apparatus. In this instance, the current necessary for the removal of ions cannot flow, giving rise to a deterioration of the quality of processed water. What is worse, grown scale invades the inside of the ion exchange membrane and ultimately breaks the ion exchange membrane.

In an effort to decrease the electric resistance originating from the concentrate chamber and to prevent scale formation, an electrodeionization water producing apparatus having a concentrate chamber packed with ion exchange materials has been proposed. As an ion exchange material for packing the concentrate chamber and the form of filling such an ion exchange material, common bead ion exchange resins of styrene-divinylbenzene copolymer containing sulfonic groups and quaternary ammonium groups introduced therein is known, for example. Japanese Patent Application Laid-open No. 2001-225078 discloses an electrodeionization water producing apparatus having organic porous anion exchange material layers spread in the concentrate chamber. As examples of the organic porous anion exchange material, the patent application discloses an organic fine porous membrane made from polyolefin or fluorine-containing resin with anion exchange groups introduced by radical polymerization or radiation-initiated polymerization, a material derived from said organic fine porous membrane prepared by impregnating it with a water-soluble polymer having anion exchange groups, followed by immobilizing the water-soluble polymer by heat treatment or the reaction of the water-soluble polymer with said organic fine porous membrane, and an organic porous anion exchange material prepared by bonding a bead anion exchange resin with a binder containing low density polyethylene as a main component.

The patent specification claims that scale formation can be prevented in such an electrodeionization water producing apparatus having a concentrate chamber packed with an ion exchange material because the electric resistance is decreased due to conductivity of the ion exchange material and also because local mixing of calcium ion or magnesium ion with carbonate ion or hydroxide ion in excess of the solubility product constant due to uneven distribution of ions in the concentrate chamber can be prevented.

However, a concentrate chamber packed with the above-described conventional ion exchange resins or organic porous anion exchange material layers cannot exhibit a sufficient electric resistance reduction effect due to insufficient conductivity of these ion exchange materials. For this reason, the thickness of the concentrate chamber is limited to a certain level, which precludes satisfactory prevention of local mixing of calcium ion or magnesium ion with carbonate ion or hydroxide ion in excess of the solubility product constant, which causes scaling.

Generally, in an electrodeionization water producing apparatus, ions are discharged from a depletion chamber to the next chamber through an ion exchange membrane by electrophoresis, whereas ions coming in the concentrate chamber are precluded from moving by electrophoretic migration by the ion exchange membrane and are only discharged from the outlet port together with effluent water. When an ion exchange material is packed in such a concentrate chamber, almost all ion exchange groups possessed by the ion exchange material form ion pairs with impurity ions other than hydrogen ion and hydroxide ion during steady operation. Since the conductivity of ion exchange material is greatly affected by the mobility of counter ions and the hydrogen ion and hydroxide ion have a mobility several times greater than other ions, the electric resistance of an ion exchange material in which the counter ions are impurity ions other than the hydrogen ion and hydroxide ion is significantly higher than the electric resistance of other ion exchange materials in which the counter ions are hydrogen ions and hydroxide ions. In contrast, in the depletion chamber most counter ions for ion exchange groups are hydrogen ions and hydroxide ions during normal operation. The electric resistance of the depletion chamber is maintained comparatively low due to the mobility of these ions.

Specifically, in an ion exchange material packed in the concentrate chamber in which almost all counter ions are impurity ions during normal operation, no electric resistance reduction owing to having hydrogen ions and hydroxide ions as counter ions can be expected. Therefore, the ion exchange material itself must have high conductivity. However, the above-mentioned conventional ion exchange resins and organic porous anion exchange materials are not designed to have conductivity themselves. Specifically, spherical ion exchange resins with a diameter of 0.2 to 0.5 mm made from a styrene-divinyl benzene (DVB) copolymer with a sulfonic acid group ($R-SO_3^-H^+$) introduced as a cation exchange group and a quaternary ammonium group ($R-N^+R_1R_2R_3$) as an anion exchange group have been used heretofore as typical ion exchange resins. In these ion exchange resins, current transmission (or transmission of ions) in ion exchange resin beads is effected at low-resistance via ion exchange groups uniformly and densely dispersed in the polymer gel, whereas in the interface of ion exchange resin beads, the flow of ions is concentrated on the interface due to a long migration distance of the ions in water during movement of ions and also due to a small contact area between the beads because of the spherical form of the resin beads, thereby precluding current transmission and causing an electric resistance to increase. Among the aforementioned organic porous anion exchange materials disclosed in Japanese Patent Application Laid-open No. 2001-225078, the organic fine porous membrane with anion exchange groups introduced by radical polymerization or radiation-initiated polymerization and the material derived from the organic fine porous membrane prepared by impregnating it with a water-soluble polymer having anion exchange groups, followed by immobilization of the water-soluble polymer by heat treatment or the reaction of the water-soluble polymer with the organic fine porous membrane have no ion exchange groups in the organic fine porous membrane functioning as a base, but merely contain anion exchange groups introduced on the surface. Therefore, migration of ions is limited to near the surface of the ion exchange material, providing no sufficient electric resistance reducing effect. In the case of the organic porous anion exchange material prepared by bonding bead anion exchange resin with a binder containing low density polyethylene as a main component, ion exchange groups are not present in the binder portion or, even if present, the structures of the binder polymer matrix and ion exchange groups in the binder portion are different from those in the ion exchange resin portion. In addition, the density of the ion exchange groups in the binder portion is lower than that of the ion exchange resin portion. The material is not a homogeneous ion exchanger as a whole. Therefore, migration of ions still remains inhomogeneous and improvement with regard to electric resistance is not necessarily sufficient.

Since the concentrate chamber formed by packing these conventional ion exchange materials does not exhibit a sufficient electric resistance reducing effect in this manner, the thickness of the concentrate chamber must be minimized, giving rise to a problem of insufficient scale prevention effect The scale prevention mechanism in concentrate chambers packed with ion exchange materials is as follows. Specifically, in the area of the concentrate chamber packed with anion exchange materials, anions having permeated through the anion exchange membrane do not move into concentrate water, but pass through the high conductivity anion exchange material and move to the cation exchange membrane, where anions migrate into the concentrate water for the first time. In the same manner, in the area of the concentrate chamber packed with cation exchange materials, cations having permeated through the cation exchange membrane do not move into the concentrate water, but pass through the high conductivity cation exchange materials and move to the anion exchange membrane, where cations migrate into the concentrate water for the first time. For this reason, the high concentration area for calcium ions and magnesium ions and the high concentration area for carbonate ions and hydroxide ions in the liquid causing scale in the concentrate chamber are respectively in the neighborhood of the anion exchange membrane and cation exchange membrane which are located at both sides of the concentrate chamber, whereby mixing of these ions exceeding solubility product constant can be avoided and formation of scale is prevented. As is clear from this scale prevention mechanism, in order to achieve a sufficient scale prevention effect in the concentrate chamber, the distance of the anion exchange membrane and cation exchange membrane located at both sides of the concentrate chamber, specifically, the thickness of the concentrate chamber, must be sufficiently secured. However, since the conventional ion exchange materials filled in the concentrate chamber do not exhibit a sufficient electric resistance reducing effect as mentioned above, the thickness of the concentrate chamber cannot be made as large as desired, giving rise to a problem of insufficient scale prevention effect.

An object of the present invention is therefore to provide an electrodeionization water-producing apparatus having a scale-free concentrate chamber, in which the problems of electric resistance reduction and scale formation have been solved by remodeling the structure of the concentrate chamber in the electrodeionization water producing apparatus so that the electric resistance can be reduced and formation of scale in the concentrate chamber can be prevented during a continuous operation over a long period of time, and a method of producing deionized water using the same.

SUMMARY OF THE INVENTION

In view of the above-described situation, the inventors of the present invention have conducted extensive studies and, as a result, have found that the electric resistance during continuous operation of an electrodeionization water producing apparatus can be sufficiently reduced if a specific organic porous ion exchange material having a continuous porous structure is used as a filler for a concentrate chamber, so that not only can the voltage be decreased to reduce power consumption or the operation cost, but also scale formation can be sufficiently prevented because of a large thickness allowed for the concentrate chamber due to the low electric resistance of the organic porous ion exchange material. These findings have led to the completion of the present invention.

Specifically, the present invention provides an electrodeionization water production apparatus comprising a depletion chamber packed with an ion exchange material, the depletion chamber being partitioned by a cation exchange membrane on one side and an anion exchange membrane on the other side, and concentrate chambers installed on both sides of the depletion chamber with the cation exchange membrane and the anion exchange membrane disposed inbetween, the depletion chamber and the concentrate chambers disposed between an anode chamber equipped with an anode and a cathode chamber equipped with a cathode, wherein the concentrate chambers are packed with an organic porous cation exchange material which has a continuous pore structure comprising interconnected macropores and mesopores with an average diameter of 1 to 1,000 µm existing on the walls of the interconnected macropores. This structure reduces the electric resistance originating from the concentrate chambers due to high conductivity of the organic porous ion exchange material, which results in the decrease of voltage during the operation of the apparatus, leading to saving of power consumption and therefore, which reduces operating cost. In addition, the thickness of the concentrate chamber can be sufficiently secured due to the low electric resistance of the organic porous ion exchange material, which results in prevention of scale formation.

The present invention further provides the above electrodeionization water producing apparatus, wherein the depletion chambers are two small depletion chambers, filled with an ion exchange material, formed in the areas partitioned by a cation exchange membrane on one side, an anion exchange membrane on the other side, and an intermediate ion exchange membrane disposed between the cation exchange membrane and the anion exchange membrane. This structure ensures that the remodeled electrodeionization water producing apparatus exhibits the same effects as exhibited by the above-described apparatus of the present invention. In addition, at least one small depletion chamber of the two small depletion chambers may be filled with only one ion exchange material, e.g. an anion exchange material or cation exchange material, or may be filled with a mixture of the anion exchange material and cation exchange material, so that an optimum thickness can be set for each type of ion exchange material to achieve reduction in the electric resistance and to obtain high performance.

The present invention further provides a method of producing deionized water comprising passing direct current between the cathode and anode of the above electrodeionization water producing apparatus, passing water to be processed through the depletion chamber, concentrate water through the concentrate chambers, and electrode water through the anode chamber and cathode chamber, obtaining from the depletion chamber deionized water with impurity ions removed therefrom, and obtaining from the concentrate chamber concentrate water in which impurity ions are concentrated.

The present invention further provides a method of producing deionized water comprising passing direct current between the cathode and anode of the above electrodeionization water producing apparatus, feeding water to be processed to one of the small depletion chambers partitioned by the intermediate ion exchange membrane and the anion exchange membrane on said other side, feeding effluent water from said small depletion chamber to the other small depletion chamber partitioned by the cation exchange membrane on said one side and the intermediate ion exchange membrane, passing concentrate water through the concentrate chambers, passing electrode water through the anode chamber and cathode chamber, obtaining from said other small depletion chamber deionized water with impurity ions removed therefrom, and obtaining from the concentrate chambers concentrate water in which impurity ions are concentrated.

DETAILED DESCRIPTION OF THE INVENTION AND PREFERRED EMBODIMENT

Figure 1:
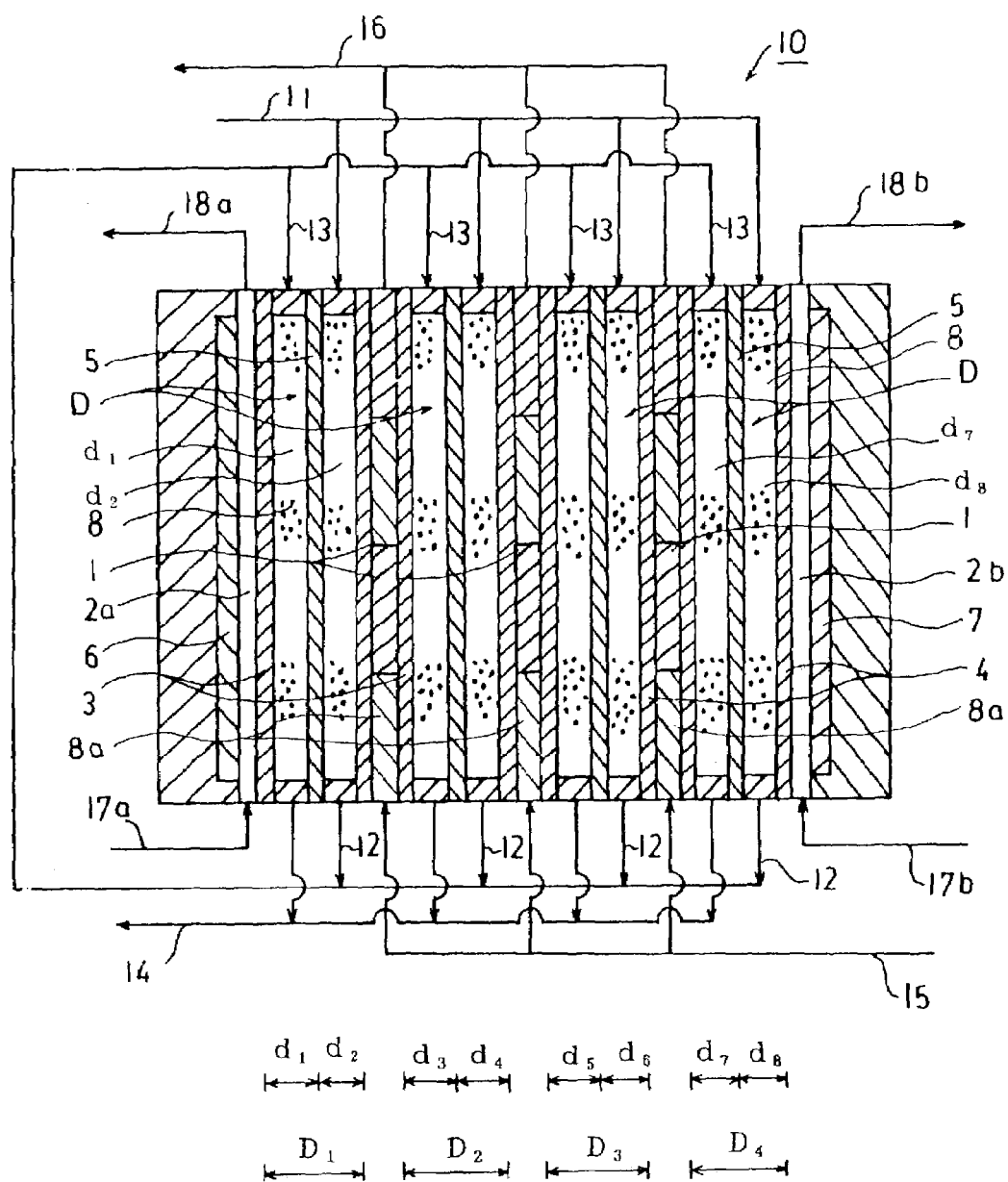
FIG. 1 is a schematic drawing describing an embodiment of the electrodeionization water producing apparatus of the present invention.

An embodiment of the electrodeionization water producing apparatus of the present invention will be explained with reference to FIG. 1. FIG. 1 is a drawing describing an embodiment of the electrodeionization water producing apparatus. As shown in FIG. 1, a cation exchange membrane 3, an intermediate ion exchange membrane 5, and an anion exchange membrane 4 are alternately disposed with a space between them. An ion exchange material 8 is filled in the spaces formed by the cation exchange membrane 3 and the intermediate ion exchange membrane 5, thereby forming first small depletion chambers $d_1$, $d_3$, $d_5$, and $d_7$. An ion exchange material 8 is filled in the spaces formed by the intermediate ion exchange membrane 5 and the anion exchange membrane 4, thereby forming second small depletion chambers $d_2$, $d_4$, $d_6$, and $d_8$. The first small depletion chamber $d_1$ and the second small depletion chamber $d_2$ make up a depletion chamber $D_1$, the first small depletion chamber $d_3$ and the second small depletion chamber $d_4$ make up a depletion chamber $D_2$, the first small depletion chamber $d_5$ and the second small depletion chamber $d_6$ make up a depletion chamber $D_3$, and the first small depletion chamber $d_7$ and the second small depletion chamber $d_8$ make up a depletion chamber $D_4$. The area formed by the anion exchange membrane 4 and cation exchange membrane 3 respectively adjacent to the depletion chambers $D_2$ and $D_3$, packed with the ion exchange material 8a, serves as a concentrate chamber 1 for passing concentrate water. These components are arranged from left to right in the drawing in the order of depletion chamber $D_1$, concentrate chamber 1, depletion chamber $D_2$, concentrate chamber 1, depletion chamber $D_3$, concentrate chamber 1, and depletion chamber $D_4$. A cathode chamber 2a is formed on the left of the depletion chamber $D_1$ with the cation exchange membrane 3 in-between and an anode chamber 2b is formed on the right of the depletion chamber $D_4$ with the anion exchange membrane in-between. In addition, in two adjacent small depletion chambers with the intermediate ion exchange membrane 5 disposed between them, processed water discharge lines 12 for the second small depletion chambers are connected to processed water feed lines 13 for the first small depletion chambers.

Figure 2:
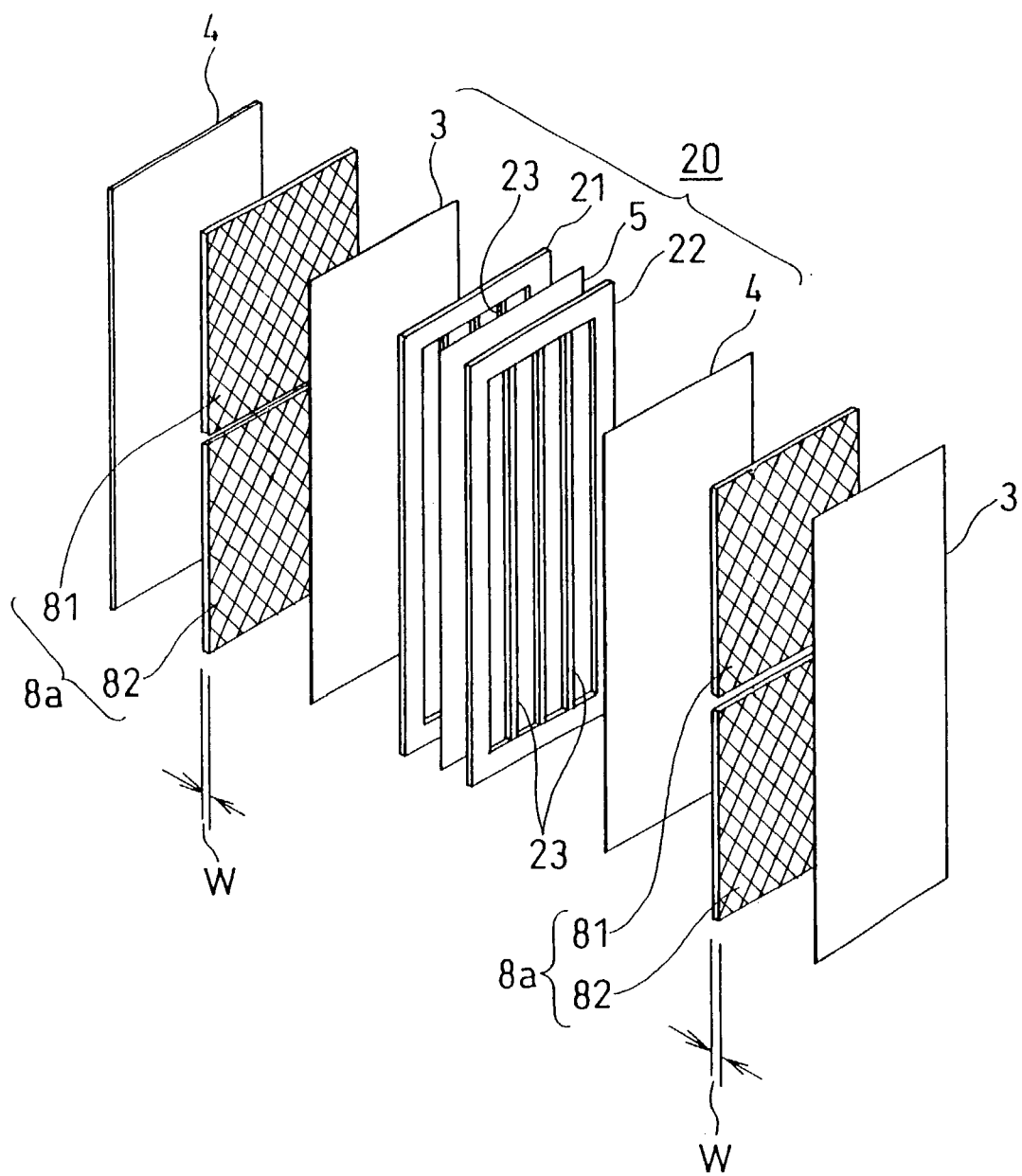
FIG. 2 is a drawing describing the structures of the depletion chamber module and the concentrate chambers.

Such depletion chambers are made up of a deionizing module 20 formed by two frames 21, 22 and three ion exchange membranes 3, 5, and 4, as shown in FIG. 2. Specifically, the cation exchange membrane 3 is sealingly attached to the surface of one side of the first frame 21, an ion exchange material is packed in the inner space of the first frame 21, and the intermediate ion exchange membrane 5 is sealingly attached to the surface of the other side of the first frame 21, thereby forming the first small depletion chamber. Next, the second frame 22 is sealingly attached with the intermediate ion exchange membrane 5 being sandwiched between the first frame 21 and the second frame 22, an ion exchange material is packed in the inner space of the second frame 22, and the anion exchange membrane 4 is sealingly attached to the surface of the other side of the second frame 22, thereby forming the second small depletion chamber. Although there are no specific limitations to the ion exchange materials to be filled in the first and second small depletion chambers, it is desirable to fill the second small depletion chamber, to which water to be processed is first sent, with an anion exchange material, and to fill the first small depletion chamber, to which the effluent from the second small depletion chamber is fed, with a mixture of an anion exchange material and a cation exchange material. This manner of filling the ion exchange materials can ensure sufficient processing of water containing a large amount of anionic components, particularly weakly acidic components such as silica and carbonic acid. A symbol 23 is a rib for reinforcing the frame.

The concentrate chamber 1 is packed with an organic porous ion exchange material having a continuous pore structure which comprises interconnected macropores and mesopores with an average diameter of 1 to 1,000 µm, preferably 10 to 100 µm, existing on the walls of the interconnected macropores. The continuous pore structure usually includes a structure in which macropores with an average diameter of 2 to 5,000 µm are layered. The layered section has mesopores functioning as common openings, most of the mesopores having an open pore structure. In the open pore structure, pores formed from the macropores and mesopores become flowing paths when water is caused to flow. If the average diameter of mesopores is less than 1 µm, pressure loss during water permeation is too great. The average diameter of mesopores more than 1,000 µm, on the other hand, results in difficulty in forming uniform flowing paths of water. The organic porous ion exchange material with the above continuous pore structure can remarkably increase the pore volume and specific surface area.

In addition, the organic porous ion exchange material has a total pore volume of 1 to 50 ml/g. If the total pore volume is less than 1 ml/g, the amount of water permeating through a unit area becomes small, allowing limited permeation of water. On the other hand, a total pore volume of more than 50 ml/g is undesirable because the proportion occupied by the polymer and the like forming the skeleton decreases, resulting in unduly impaired strength. The material for the matrix forming the continuous pores structure is an organic polymer material having chemical restraint points such as a crosslinking structure and physical restraint points such as crystals and the like. When the polymer material contains a crosslinking structure, the amount of the crosslinking structural units is in the range of 10 to 90 mol % of the total amount of all structural units forming the polymer material. If the amount of the crosslinking structural units is less than 10 mol %, the mechanical strength is insufficient. If the amount is more than 90 mol %, it is difficult to introduce ion exchange groups, resulting in a product with an insufficient ion-exchange capacity. There are no specific limitations to the type of polymer material. Examples include styrene-based polymers such as polystyrene, poly($\alpha$-methylstyrene), poly(vinyl benzyl chloride), and crosslinked materials of these polymers; polyolefins such as polyethylene and polypropylene, as well as crosslinked materials of these polymers; poly(halogenated olefin) such as polyvinyl chloride and polytetrafluoroethylene, as well as crosslinked materials of these polymers; nitrile-based polymers such as polyacrylonitrile and crosslinked materials of these polymers; (meth)acrylic-type polymers such as poly(methyl methacrylate) and poly(ethyl acrylate), as well as crosslinked materials of these polymers; styrene-divinyl benzene copolymer, vinyl benzyl chloride-divinylbenzene copolymer, and the like. The above polymers may be either homopolymers obtained by the polymerization of one type of monomer or copolymers obtained by the polymerization of two or more types of monomers. In addition, a blend of two or more polymers may be used. Among these organic polymers, styrene-divinylbenzene copolymer and vinyl benzyl chloride-divinyl benzene copolymer are preferable in view of ease of introduction of ion exchange groups and high mechanical strength. The continuous pore structure of the organic porous ion exchange material of the present invention can be observed comparatively easily by using a scanning electron microscope (SEM).

The organic porous ion exchange material packed in the concentrate chambers contains uniformly dispersed ion exchange groups and has an ion exchange capacity of 0.5 mg equivalent/g or more, and preferably 2.0 mg equivalent/g or more of dry porous material. If the ion exchange capacity is less than 0.5 mg equivalent/g of dry porous material, the electric resistance is too great. If the distribution of ion exchange groups is not uniform, transmission of ions and electrons in the porous ion exchange material becomes non-uniform, giving rise to only insufficient improvement with regard to electric resistance. The "uniform distribution of ion exchange groups" herein refers to uniformity of ion exchange group distribution in the order of μm or less. Distribution conditions of ion exchange groups can be identified comparatively easily by using an analytical technique such as electron probe micro-analysis (EPMA), secondary ion mass spectrometry (SIMS), and the like. As ion exchange groups to be introduced into the porous ion exchange material, cationic exchange groups such as a carboxylic acid group, iminodiacetic acid group, sulfonic acid group, phosphoric acid group, phosphate group, and hydroxyl group of aromatic compounds; anionic exchange groups such as a quaternary ammonium group, tertiary amino group, secondary amino group, primary amino group, polyethylene imine group, tertiary sulfonium group, and phosphonium group; ampholytic ion exchange groups such as an amino phosphoric acid group, betaine, and sulfobetaine; and the like can be cited. The organic porous ion exchange material exhibits high conductivity because current (ions) is transmitted inside the resin of this type of continuous porous structure via ion exchange groups that are uniformly and densely present in polymer gels.

There are no specific limitations to the method of manufacturing the organic porous ion exchange material. A method of manufacturing the porous material from the components containing ion exchange groups in one step, a method of first manufacturing a porous material from the components not containing an ion exchange group and then introducing ion exchange groups, and the like can be cited as examples. One example of the method for manufacturing the organic porous ion exchange material will now be described. Specifically, the method comprises preparing a water-in-oil type emulsion by mixing an oil-soluble monomer not containing an ion exchange group, a surfactant, water, and as required, a polymerization initiator, and polymerizing the water-in-oil type emulsion to obtain a porous material. Ion exchange groups are introduced into the porous material to obtain the organic porous ion exchange material. The oil-soluble monomer not containing an ion exchange group indicates a lipophilic monomer that does not contain an ion exchange group such as a carboxylic acid group or sulfonic acid group and has low solubility in water. Specific examples of such a monomer include styrene, $\alpha$-methylstyrene, vinyl toluene, vinyl benzyl chloride, divinylbenzene, ethylene, propylene, isobutene, butadiene, isoprene, chloroprene, vinyl chloride, vinyl bromide, vinylidene chloride, tetrafluoroethylene, acrylonitrile, methacrylonitrile, vinyl acetate, methyl acrylate, ethyl acrylate, butyl acrylate, 2-ethylhexyl acrylate, trimethylol propane triacrylate, butanediol diacrylate, methyl methacrylate, ethyl methacrylate, propyl methacrylate, butyl methacrylate, 2-ethylhexyl methacrylate, cyclohexyl methacrylate, benzyl methacrylate, glycidyl methacrylate, and ethylene glycol dimethacrylate. These monomers can be used either individually or in combinations of two or more. However, to obtain the necessary mechanical strength for introducing many ion exchange groups in the later step, it is desirable to select a crosslinking monomer, such as divinylbenzene and ethylene glycol dimethacrylate, as one monomer component, and incorporate such a monomer in an amount of 5 to 90 mol %, preferably 10 to 80 mol % of the total amount of oil-soluble monomers.

There are no specific limitations to the types of surfactant inasmuch as a water-in-oil (w/o) type emulsion can be formed when the oil-soluble monomer not containing an ion exchange group is mixed with water. Examples of the surfactants include nonionic surfactants such as sorbitan monooleate, sorbitan monolaurate, sorbitan monopalmitate, sorbitan monostearate, sorbitan trioleate, polyoxyethylene nonylphenyl ether, polyoxyethylene stearyl ether, and polyoxyethylene sorbitan monooleate; anionic surfactants such as potassium oleate, sodium dodecylbenzenesulfonate, and dioctyl sodium sulfosuccinate; cationic surfactants such as distearyldimethyl ammonium chloride; and ampholytic surfactants such as lauryldimethylbetaine. These surfactants may be used either individually or in combinations of two or more. The term "w/o-type emulsion" means an emulsion having a continuous oil phase in which water droplets are dispersed. Although the amount of the above surfactants to be added significantly varies according to the type of oil-soluble monomers and the size of target emulsion beads (macropores), a specific amount of the surfactant can be selected from the range of about 2% to 70% of the total amount of the oil-soluble monomers and surfactants. In addition, although not necessarily essential, alcohols such as methanol and stearyl alcohol, carboxylic acids such as stearic acid, or hydrocarbons such as octane and dodecane may be added to control the shape and size of foams of the porous material.

A compound that generates radicals by heat or light is suitably used as the polymerization initiator. The polymerization initiator may be either water-soluble or oil-soluble. Examples include azobisisobutyronitrile, azobiscyclohexanenitrile, azobiscyclohexanecarbonitrile, benzoyl peroxide, potassium persulfate, ammonium persulfate, hydrogen peroxide-iron chloride, sodium persulfate-acidic sodium sulfite, tetramethylthiuram disulfide, and the like. In some reaction systems, polymerization proceeds only by heat or light without the addition of a polymerization initiator. In such a case, the polymerization initiator need not be added.

There are no specific limitations to the method of mixing the oil-soluble monomer not containing ion exchange groups, a precipitant, a surfactant, water, and a polymerization initiator to prepare a water-in-oil type emulsion. A method of mixing these components altogether, a method of preparing a mixture of oil-soluble components, which include oil-soluble monomers, precipitants, surfactants, and oil-soluble polymerization initiators, and a solution of aqueous components, which includes water and water-soluble polymerization initiators, and mixing the mixture and solution, and other similar methods can be used. There are also no specific limitations to the mixing apparatus for forming the emulsion. Conventional mixers, homogenizers, high-pressure homogenizers, planet-type stirrer, and the like can be used under emulsification conditions arbitrarily selected for obtaining emulsion having a target beadsize.

Various polymerization conditions can be selected for polymerizing the obtained water-in-oil type emulsion according to the type of monomers and polymerization initiators. For example, when azobisisobutyronitrile, benzoyl peroxide, potassium persulfate, or the like is used as the polymerization initiator, the emulsion may be polymerized with heating at 30 to 100° C. for 1 to 48 hours in a sealed vessel under an inert gas atmosphere. When hydrogen peroxide-iron chloride, sodium persulfate-acidic sodium sulfite, or the like is used as the polymerization initiator, the emulsion may be polymerized at 0 to 30° C. for 1 to 48 hours in a sealed vessel under an inert gas atmosphere. After the polymerization, the reaction mixture is removed from the reaction vessel and, if necessary, extracted with a solvent such as isopropanol to remove unreacted monomers and surfactants, thereby yielding a porous material.

As a method for introducing ion exchange groups into the porous material, known methods such as a macromolecular reaction, graft polymerization, and the like can be used without any specific limitations. For example, as methods for introducing a sulfonic acid group, a method of sulfonating an organic porous material with chlorosulfuric acid, concentrated sulfuric acid, and fuming sulfuric acid, if the organic porous material is a styrene-divinylbenzene copolymer or the like; a method of introducing a radical initiation group or chain transfer group to an organic porous material and grafting sodium styrene sulfonate or acrylamide-2-methylpropane sulfonic acid with the resulting product; a method of introducing sulfonic acid group by functional group conversion after graft polymerization of glycidyl methacrylate with an organic porous material; and the like can be cited. As a method of introducing a quaternary ammonium group when the organic porous material is a styrene-divinylbenzene copolymer or the like, a method of introducing a chloromethyl group using chloromethyl methyl ether or the like and reacting the resulting product with a tertiary amine; a method of preparing an organic porous material by the copolymerization of chloromethyl styrene and divinylbenzene, and then reacting the copolymer with a tertiary amine with the resulting product; a method of introducing a radical initiation group or chain transfer group to an organic porous material and grafting N,N,N-trimethylammonium ethyl acrylate or N,N,N-trimethylammonium propyl acrylamide; a method of introducing the quaternary ammonium group by functional group conversion after graft polymerization of glycidyl methacrylate with an organic porous material; and the like can be cited. As a method of introducing a betaine, a method of introducing a tertiary amine to the organic porous material by the method described above and then reacting the resulting product with mono-iodoacetic acid and the like can be cited. The same ion exchange groups as mentioned above can be introduced.

There are no specific limitations to the method of filling the concentrate chamber with the organic porous ion exchange material. As examples, a single bed anion exchange material, a single bed cation exchange material, a composite bed comprising two or more layers of the single bed anion exchange material and single bed cation exchange material alternately layered in the concentrate water flow-in direction, a composite bed comprising two or more layers of the single bed anion exchange material and single bed cation exchange material alternately layered in the direction perpendicular to the concentrate water flow-in direction, and the like can be cited. Of these, the composite bed comprising two or more layers of the single bed anion exchange material and single bed cation exchange material alternately layered in the concentrate water flow-in direction is preferable due to the lower probability of forming scale as discussed later. The concentrate chamber 1 shown in FIG. 2 is prepared by sandwiching the organic porous ion exchange materials 81 and 82, cut into a prescribed size, between the anion exchange membrane 4 on one side and the cation exchange membrane 3 on the other side. In FIG. 2, the organic porous ion exchange material is a laminated bed 8a consisting of the organic porous anion exchange material 81 on the upper side and the organic porous cation exchange material 82 on the lower side. Specifically, when two sheets of ion exchange material, i.e. a sheet of organic porous cation exchange material 81 and a sheet of organic porous anion exchange material 82 having the same size as the organic porous cation exchange material 81, are packed in lamination in concentration chambers of flat plate lamination type electrodeionization water producing apparatus, the resulting organic porous ion exchange material formed from the two beds of ion exchange material has almost the same length and width as the ion exchange membranes 3 and 4 on the both sides, and the thickness (w) of the organic ion exchange material is the same as the thickness of the concentrate chamber. When the organic porous ion exchange material is packed as a composite bed, there are no specific limitations to the order of the organic porous ion exchange material layered and packed in the flow-in or flow-out directions of the concentrate chamber. Either the order of organic porous cation exchange material and the organic porous anion exchange material from the flowing directions of the concentrate chamber or its reverse order may be employed. The ion exchange materials with different ionic properties are layered with the end portions being in contact with or kept close to one another, in inasmuch as a large clearance is not produced. If the organic porous ion exchange materials are uniformly packed in layers in such a concentrate chamber, ion exchange membranes on both sides of the concentrate chamber are electrically connected, allowing ions to move and the ion concentration gradient of the concentrate water to decrease. The shape of these organic porous ion exchange materials is not limited to the plate mentioned above. A block shape and an undefined shape, as well as combination of two or more shapes can be used. Of these a plate and block are desirable for ensuring a decrease in the electric resistance and easy fabrication.

The organic porous ion exchange material having the above-mentioned continuous pore structure may further be provided with passages other than the continuous pores formed from the above-described macropores and mesopores to reduce the pressure difference of flow in the concentrate chamber. Such other passages include, but are not limited to, for example, one or more through-holes formed parallel to the flow-in direction of concentrate water, comb-like passages formed as continuous grooves running in parallel with or perpendicular to the flow-in direction of concentrate water, zigzag passages with no specific directions designed to allow concentrate water to run meandering in the concentrate chamber, mess-like passages, and the like. These passages may be either continuous or discontinuous from the inlet port of the concentrate water through the outlet port. These passages may be formed by selecting the configuration of the container when forming the continuous pore structure by polymerization or by processing the continuous pore structure after polymerization. The diameter of the passages or the clearance is usually about 1 to 5 mm. In addition, it is possible to pack an oblique cross mesh or the like made of polyolefin-based polymer together with the organic porous ion exchange material to secure the other passages or clearances and to reinforce the physical strength of the organic porous ion exchange material having a continuous pore structure.

The thickness of the concentrate chamber is 0.2 to 15 mm, preferably 0.5 to 12 mm, and more preferably 3 to 10 mm. Because a thick concentrate chamber has a large electric resistance, it has conventionally been impossible to provide the concentrate chamber with a large thickness. The upper limit has been 2 to 3 mm at most. Since the concentrate chamber of the present invention may be several times thicker than the conventional concentrate chamber, formation of scale can be suppressed with certainty. If the thickness of the concentrate chamber is less than 0.2 mm, the effect of preventing scale formation can be obtained only with difficulty and the pressure difference of flow tsides to increase even if the concentrate chamber is packed with a single bed of an anion exchange materials and a single bed of mesh-like cation exchange material of the organic porous ion exchange material having continuous pore structure. The thickness exceeding 15 mm is undesirable because the overall thickness of the apparatus increases.

The electrodeionization water producing apparatus is usually operated as follows. A direct current is applied between a cathode 6 and an anode 7. Water to be processed flows in from a feed water supply line 11, concentrate water flows in from a concentrate water feed line 15, whereas cathode water and anode water flow in respectively from a cathode water feed line 17a and an anode water feed line 17b. Water coming in from the feed water supply line 11 flows down through the second small depletion chambers $d_2$, $d_4$, $d_6$, and $d_8$. Impurity ions are removed when the water passes through the packed layer of ion exchange material 8. Water flowing out from the effluent water outlet line 12 of the second small depletion chambers flows down the first small depletion chambers $d_1$, $d_3$, $d_5$, and $d_7$ via the inlet water feed line 13 of the first small depletion chambers. Deionized water from which impurity ions have been removed also in these chambers can be obtain from deionized water discharge line 14 when the water from second small depletion chambers passes through the packed layer of the ion exchange material 8. Concentrate water flowing in from the concentrate water feed line 15 flows up through the concentrate chambers 1, adsorbs impurity ions coming in via the cation exchange membrane 3 and the anion exchange membrane 4, as well as impurity ions coming in via the organic porous ion exchange material in the concentrate chambers, discussed later, and is discharged from a concentrate water discharge line 16 as concentrate water in which impurity ions are concentrated. Cathode water flowing in from the cathode water feed line 17a is discharged from a cathode water discharge line 18a, and anode water flowing in from the anode water feed line 17b is discharged from an anode water discharge line 18b. Impurity ions in the water to be processed are electrically removed by the above operation.

Figure 3:
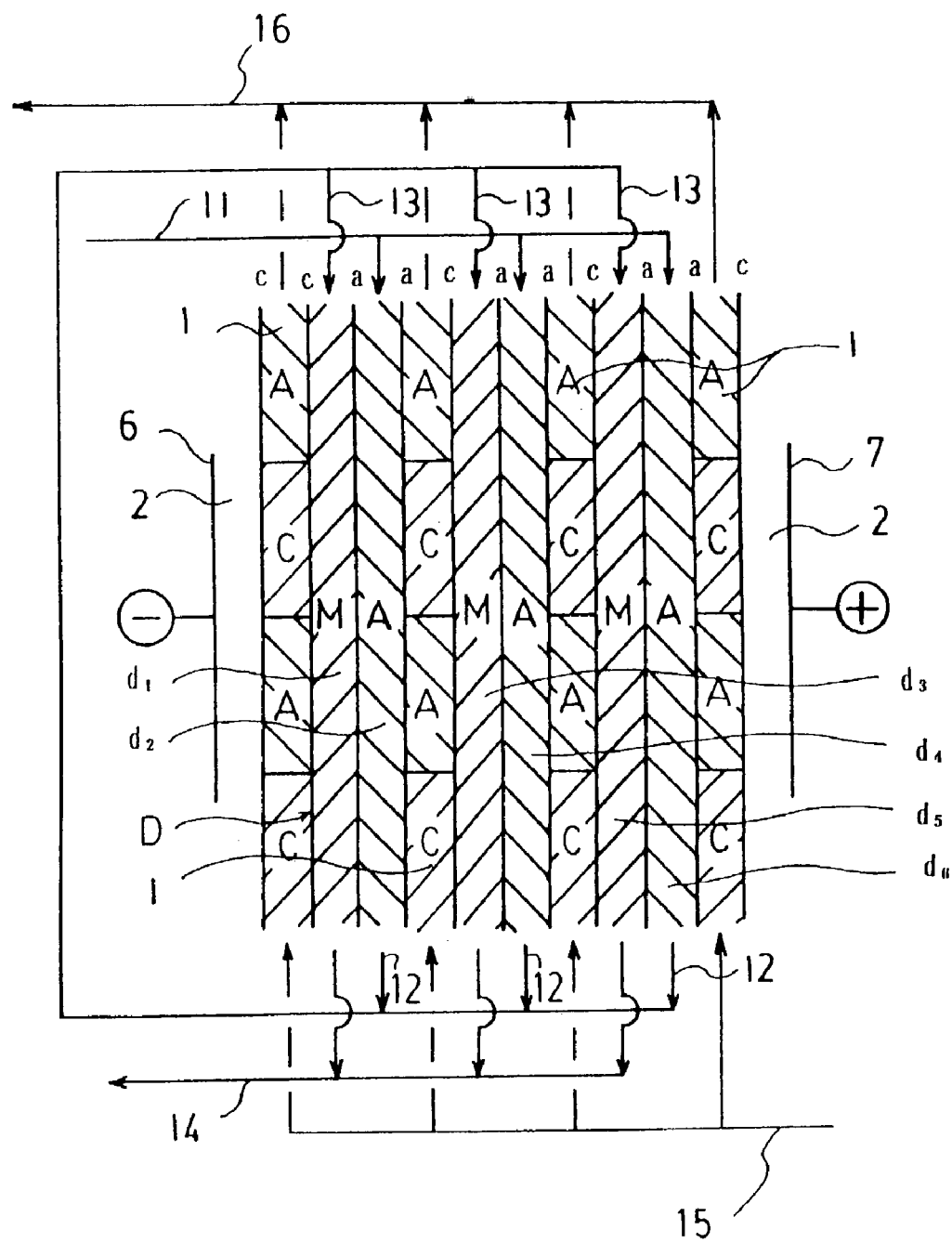
FIG. 3 is a drawing describing an outline of the electrodeionization water producing apparatus of FIG. 1.
Figure 4:
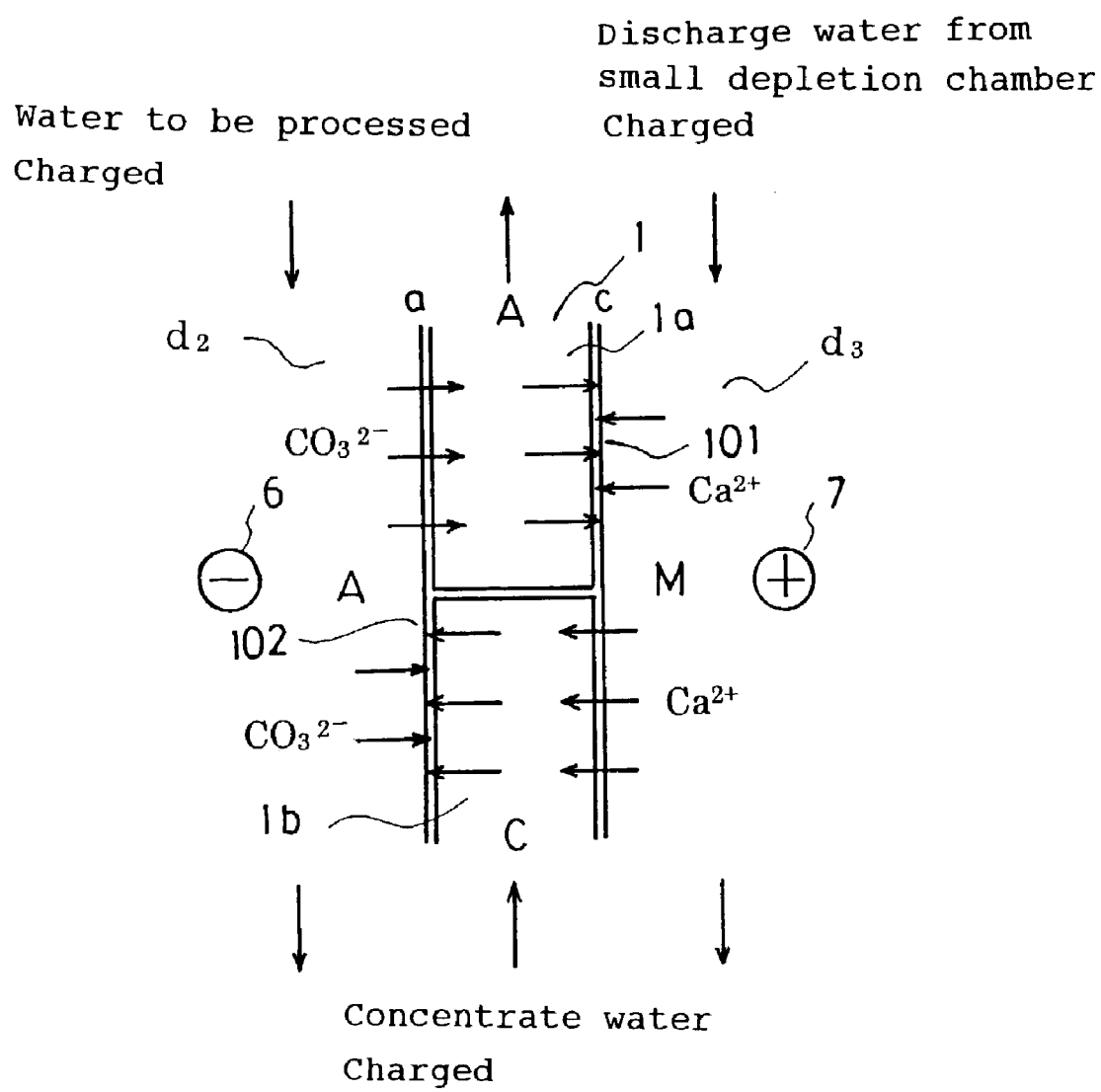
FIG. 4 is a drawing describing the migration of impurity ions in the concentrate chamber.
Figure 5:
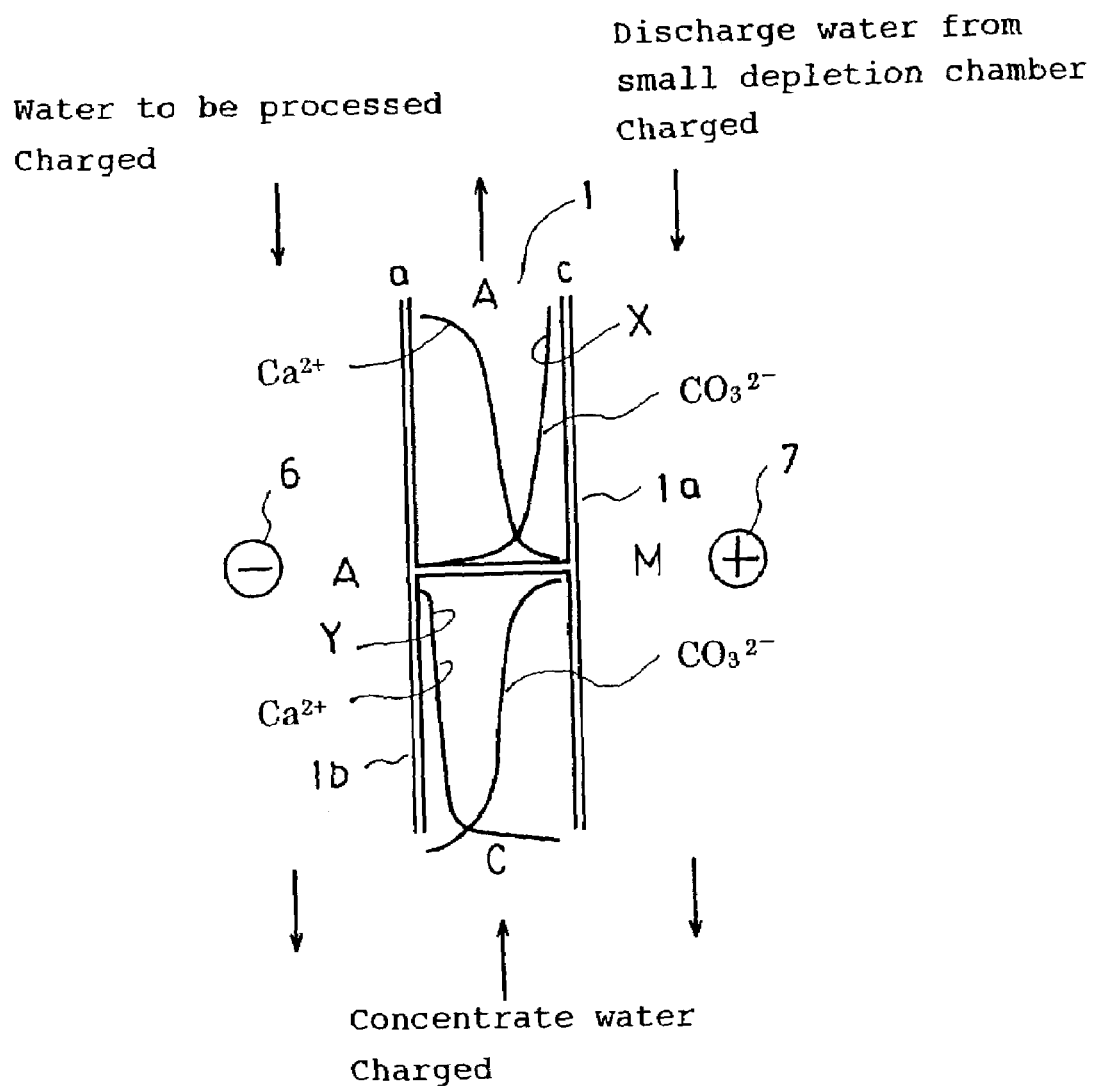
FIG. 5 is a drawing describing the concentration distribution of impurity ions in the concentrate chamber.

Next, the action of preventing scale formation in the concentrate chambers of the electrodeionization water producing apparatus of the present invention will be explained with reference to FIGS. 3 to 5. FIG. 3 is a drawing describing an outline of the electrodeionization water producing apparatus of FIG. 1 and FIGS. 4 and 5 are drawings describing the migration of impurity ions in the concentrate chambers. In FIG. 3, the second small depletion chambers $d_2$, $d_4$, and $d_6$ in which the water to be processed first flows are packed with an anion exchange material (A) and the first small depletion chambers $d_1$, $d_3$, and $d_5$ in which the water from the second small depletion chambers flows are packed with a mixed ion exchange material (M) containing an anion exchange material and a cation exchange material. The four concentrate chambers 1, disposed along the flowing direction of the concentrate chambers, are packed with an organic porous anion exchange material having a continuous porous structure of three-dimensional network (A) and an organic porous cation exchange material having the same continuous porous structure (C), alternately from the flow-out side to the flow-in side.

In a single bed area (1a) of the organic porous anion exchange material of the concentrate chamber 1, shown in FIG. 4, anions such as carbonate ions having permeated the anion exchange membrane (a) do not migrate into the concentrate water, but pass through the highly conductive organic porous anion exchange material (A) to the cation exchange membrane (c), and flow to a contact point 101 of the organic porous anion exchange material (A) and the cation exchange membrane (c), where the anions migrate into the concentrate water for the first time (FIG. 4, the arrow to the right). For this reason, anions such as carbonate ions are discharged from the concentrate chamber 1 under the conditions electrically attracted to the cation exchange membrane (c). Specifically, the concentration gradient of anions such as carbonate ions in concentrate water in the single bed area (1a) of the organic porous anion exchange material is as shown in FIG. 5. On the other hand, cations such as a calcium ion permeated through the cation exchange membrane (c) in the single bed area (1a) of the organic porous anion exchange material move in the concentrate water. For this reason, the carbonate ion, which is a counter ion for forming scale in the area in which the concentration of calcium ion is the highest, moves in the single bed area (1a) of the organic porous anion exchange material, whereby formation of scale is prevented.

In the same manner, in the single bed area (1b) of the organic porous cation exchange material of the concentrate chamber 1, cations such as a calcium ion having permeated the cation exchange membrane (c) do not migrate into the concentrate water, but pass through the highly conductive organic porous cation exchange material (C) to the anion exchange membrane (a), and flow to the contact point 102 of the organic porous cation exchange material (C) and the anion exchange membrane (a), where the cations migrate into the concentrate water for the first time (FIG. 4, the arrow to the left). For this reason, cations such as a calcium ion are discharged from the concentrate chamber 1 by the electrical attraction of the anion exchange membrane (a). Specifically, the concentration distribution of cations such as a carcium ion in concentrate water in the single bed area (1b) of the organic porous cation exchange material is as shown in FIG. 5. On the other hand, anions such as a carbonate ion that permeate the anion exchange membrane (a) move in the concentrate water. For this reason, the calcium ion, which is a counter ion for forming scale in the area in which the concentration of carbonic ion is the highest, moves in the single bed area of the organic porous cation exchange material, whereby formation of ions of scale is prevented. This manner of movement of ions also applies to magnesium ion, hydrogen ion, and hydroxide ion. In addition, if the single bed area (1a) of the organic porous anion exchange material and the single bed area (1b) of the organic porous cation exchange material are layered in the concentrate chamber, anions moving to the area in which the organic porous cation exchange material is packed move through the anion exchange membrane having a high conductivity (rather than moving through concentrate water with a low conductivity) to the organic porous anion exchange material (1a), where the anions migrate in the highly conductive organic porous anion exchange material. This manner of movement of ions also applies to cations. Specifically, only few ions move to the neighborhood of the opposing ion exchange membrane through the concentrate water, but most ions move to the neighborhood of the opposing ion exchange membrane through the organic porous cation exchange material or the organic porous anion exchange material.

Figure 6:
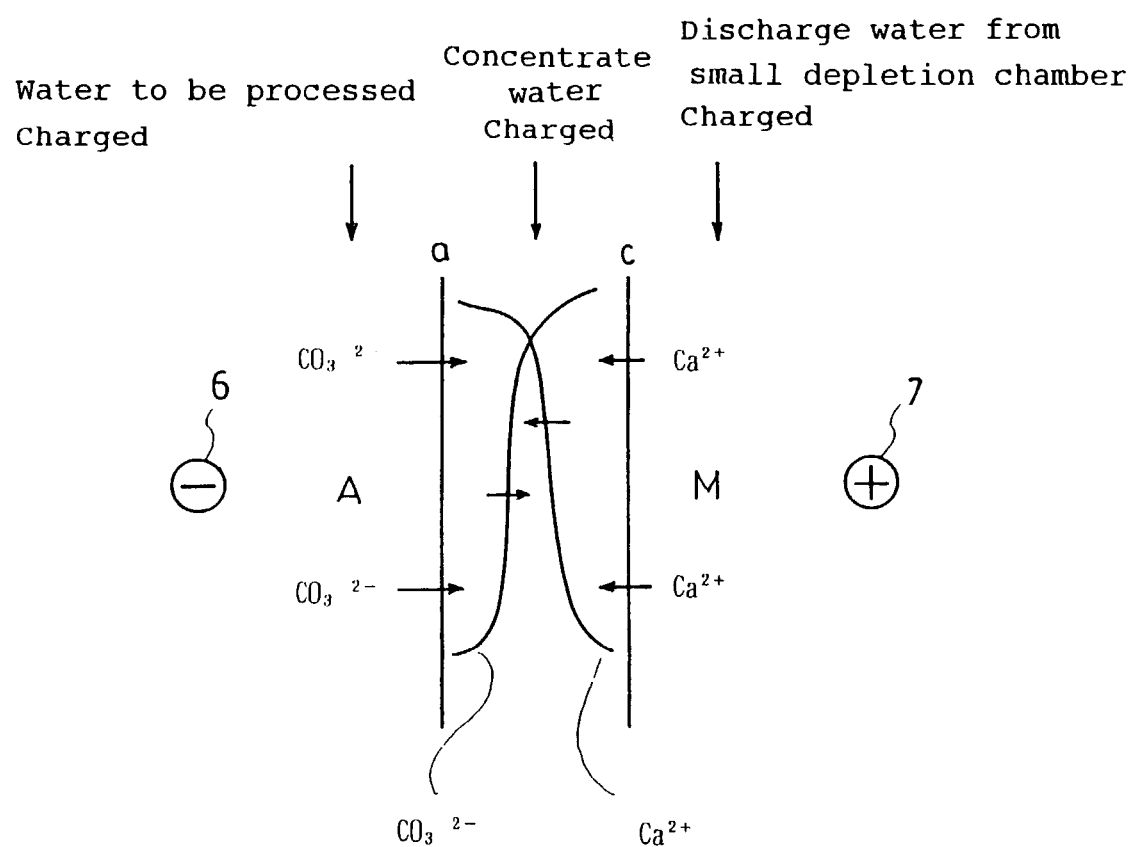
FIG. 6 is a drawing describing the concentration distribution of impurity ions in the concentrate chamber packed with no organic porous ion exchange material (conventional type).

A conventional electrodeionization water producing apparatus easily forms scale on the surface of the anion exchange membrane on the concentrate chamber side due to the following reasons. Specifically, in the conventional apparatus, the electric current applied for the purpose of regenerating ion exchange materials accelerates electrolysis of water, which induces a pH shift on the surface of the ion exchange membrane in the concentrate chamber without any ion exchange materials packed therein. As a result, the pH increases near the anion exchange membrane and decreases near the cation exchange membrane. This causes carbonate ions and calcium ions to come into contact at a high concentration gradient as shown in FIG. 6, giving rise to easy formation of scale on the surface of the anion exchange membrane on the concentrate chamber side. In this embodiment, however, since high concentration anions such as carbonate ions are not present in the concentrate water near the surface of the anion exchange membrane (a) where the cation concentration is supposed to be the highest, as mentioned above, there is no chance that carbonate ion will combine with calcium ion to produce calcium carbonate (see FIG. 5). Therefore, scale is not formed in the concentrate chamber of the electrodeionization water producing apparatus of this embodiment during long time continuous operation. In addition, since the concentrate chamber 1 is packed with organic porous ion exchange materials containing high-density ion exchange groups homogeneously distributed throughout the filling layers, the concentrate chamber 1 has an increased conductivity and can be operated with a reduced voltage, resulting in reduced power consumption.

There are no specific limitations to the flow direction of the water in the first and second small depletion chambers. In addition to the manner of flow in the above embodiment, the flow direction in the first small depletion chamber may differ from the flow direction in the second small depletion chamber. With regard to the small depletion chamber into which the water to be processed flows, in addition to the method of the above-described embodiment, the method of first feeding the water to the first small depletion chamber, causing the water to flow downward, and feeding the processed water from the first small depletion chamber to the second small depletion chamber can be applied. The flow direction of the concentrate water may also be appropriately selected.

Figure 7:
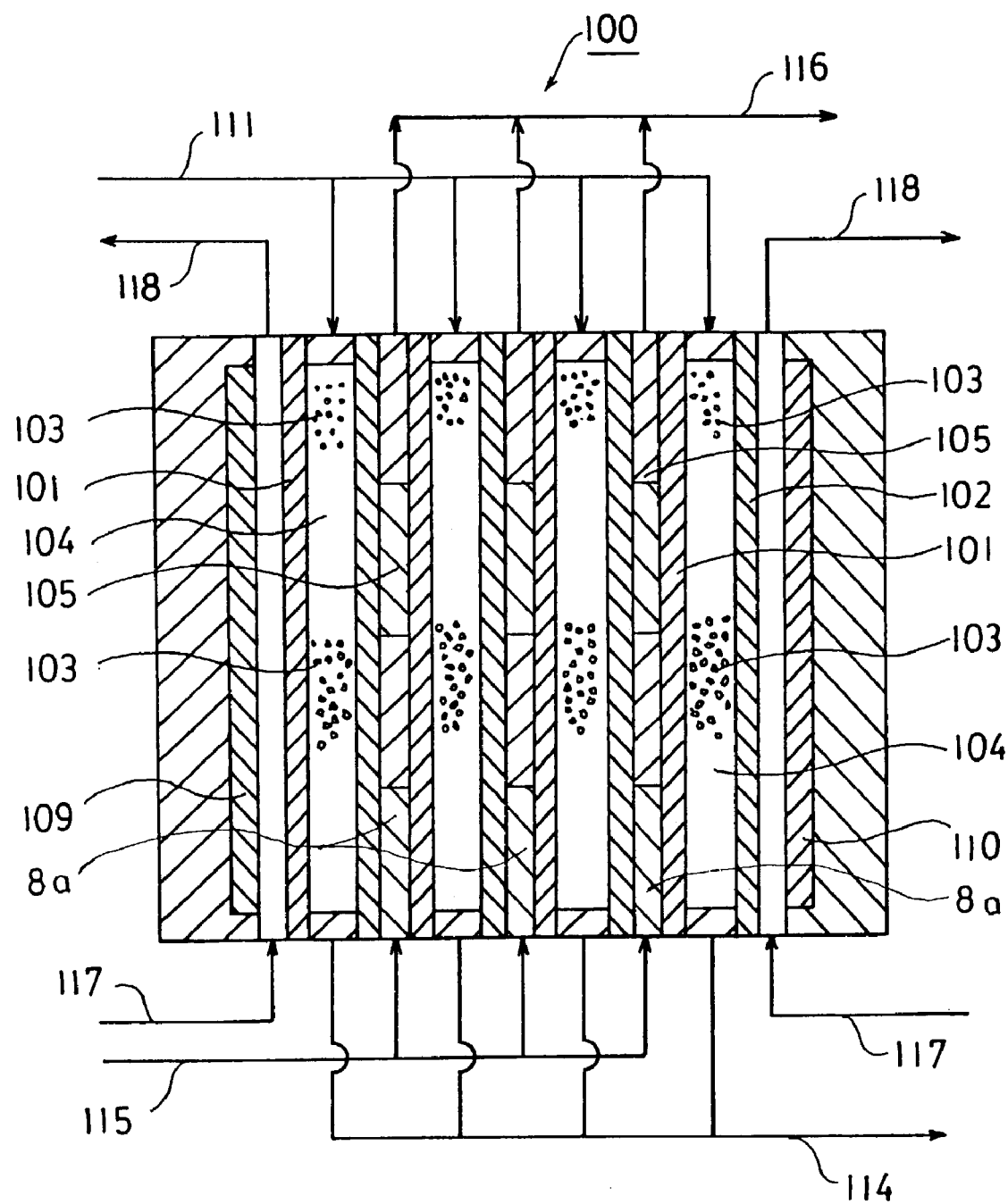
FIG. 7 is a schematic drawing describing another embodiment of the electrodeionization water producing apparatus of the present invention.

Another embodiment of the electrodeionization water producing apparatus of the present invention will be explained with reference to FIG. 7. The electrodeionization water producing apparatus 100 shown in FIG. 7 is a conventional-type electrodeionization unit not equipped with an intermediate ion exchange membrane in the remodeled-type electrodeionization water producing apparatus 10 shown in FIG. 1 and allows only a single pass of the water to be processed through the depletion chamber. Specifically, in the electrodeionization water producing apparatus 100, a chamber partitioned by a cation exchange membrane 101 on one side and an anion exchange membrane 102 on the other side is packed with an ion exchange material 103 to form a depletion chamber 104, concentration chambers 105 are provided on both sides of the desalting chamber 104 with the cation exchange membrane 101 and the anion exchange membrane 102 between them, the depletion chamber 104 and the concentration chambers 105 are disposed between an anode chamber having an anode 110 and a cathode chamber having a cathode 109, water to be processed is supplied to the depletion chamber 104 while applying a voltage, then the concentrate water is sent to the concentrate chamber 105, where impurity ions in the processed water are removed to produce deionized water. In this method, concentrate chamber 105 has the same construction as in the above embodiment to have the electrodeionization water producing apparatus 100 exhibit the same effect as mentioned above. In FIG. 7, the symbol 111 indicates a feed line of water to be processed; 114, a discharge line of deionized water; 115, a feed line of concentrate water; 116, a discharge line of concentrate water; 117, a feed line of electrode water; and 118, a discharge line of electrode water. There are no specific limitations to the type of electrodeionization water producing apparatus of the present invention. A spiral type, a concentrical cylinder type, and a flat plate lamination type can be cited as examples.

Water to be processed by the deionized water producing method of the present invention includes, but is not limited to, well water, tap water, sewage water, industrial water, river water, washing waste water of semiconductor devices or recovery water from concentration room of a semiconductor manufacturing plant, previously processed by a reverse osmosis membrane (permeate water), recovery water used in use points in a semiconductor manufacturing plant not processed by a reverse osmosis membrane, and the like. When part of the water to be processed thus supplied is also used as concentrate water, the water to be processed supplied to the depletion chamber and the concentrate water supplied to the concentrate chamber should preferably be softened to further suppress scale formation. Although the method of softening is not specifically limited, use of a softening apparatus containing sodium-type ion exchange resins and the like is preferable.

EXAMPLES

The present invention is described in more detail by examples, which should not be construed as limiting the present invention.

Example 1

An electrodeionization water producing apparatus consisting of 6 electrodeionization modules having the same structure as shown in FIG. 7 and installed in parallel was used. The specification and the operation conditions of the apparatus were as follows. Industrial water processed by reverse osmosis membrane permeation having a hardness of 200 μg $CaCO_3$/l was used as feed water to be processed in the apparatus. Part of the feed water was used as concentrate water and electrode water. After operation for 4,000 hours, scale formation in the concentrate chamber was observed. Operating conditions for obtaining processed water with a resistivity rate of 17.9 MΩ-cm after operation for 4,000 hours are shown in Table 1.

<Operating Conditions>

Electrodeionization water producing apparatus: Prototype electrodeionization unit Depletion chamber: width: 300 mm, height: 600 mm, thickness: 3 mm Ion exchange resin packed in the depletion chamber: A mixture of anion exchange resin (A) and cation exchange resin (C) (A:C=1:1 by volume)

Concentrate chamber: width: 300 mm, height: 600 mm, thickness: 5 mm

Ion exchange material packed in concentrate chamber: Four beds of single bed organic porous anion exchange material and single bed organic porous cation exchange material alternately layered in the flow direction of concentrate water Flow rate of overall apparatus: 1 $m^3$/h Example 2

An electrodeionization water producing apparatus consisting of 3 deionizing modules (6 small depletion chambers) having the same structure as shown in FIG. 1 and installed in parallel was used. The specification and the operation conditions of the apparatus were as follows. Industrial water processed by reverse osmosis membrane permeation having a hardness of 200 μg $CaCO_3$/l was used as feed water to be processed in the apparatus. Part of the feed water was used as concentrate water and electrode water. After operation for 4,000 hours, scale formation in the concentrate chamber was observed. Operating conditions for obtaining processed water with a resistivity of 17.9 MΩ-cm after operation for 4,000 hours are shown in Table 1.

<Operating Conditions>

Electrodeionization water producing apparatus: Prototype EDI Intermediate ion exchange membrane: Anion exchange membrane First small depletion chamber: width: 300 mm, height: 600 mm, thickness: 3 mm Ion exchange resin packed in the first small depletion chamber: A mixture of anion exchange resin (A) and cation exchange resin (C) (A:C=1:1 by volume)

Second small depletion chamber: width: 300 mm, height: 600 mm, thickness: 8 mm

Ion exchange resin packed in the second small depletion chamber: Anion exchange resin Concentrate chamber: width: 300 mm, height: 600 mm, thickness: 5 mm Ion exchange material packed in concentrate chamber: Alternately layered four beds of single bed organic porous anion exchange material and single bed organic porous cation exchange material in the flow direction of concentrate water Flow rate of overall apparatus: 1 $m^3$/h Comparative Example 1

Water was processed in the same manner as in Example 1, except that the concentrate chamber was 1 mm thick and was not packed with any ion exchange material. After operation for 4,000 hours, scale formation in the concentrate chamber was observed. Operating conditions for obtaining processed water with a resistivity of 17.9 MΩ-cm after operation for 4,000 hours are shown in Table 1.

Comparative Example 2

Water was processed in the same manner as in Example 2, except that the concentrate chamber was 1 mm thick and was not packed with any ion exchange material. After operation for 4,000 hours, scale formation in the concentrate chamber was observed. Operating conditions for obtaining processed water with a resistivity of 17.9 MΩ-cm after operation for 4,000 hours are shown in Table 1.

TABLE 1

| | Example | | Comparative Example | |
|---|---|---|---|---|
| | 1 | 2 | 1 | 2 |
| Average applied voltage (V) | 85 | 70 | 150 | 130 |
| Current (A) | 2 | 2 | 2 | 2 |
| Scale formation after 4,000 hours | Not formed | Not formed | Formed | Formed |

According to the present invention, reduction of electric resistance and prevention of scale formation can be achieved by remodeling the structure of the concentrate chamber of the electrode ionization water producing-apparatus. Specifically, due to high conductivity of the organic porous ion exchange material the electric resistance originating from the concentrate chamber can be reduced, which results in the decrease of voltage during the operation of apparatus, leading to reduced power consumption and operating cost. In addition, the thickness of the concentrate chamber can be expanded due to the low electric resistance of the organic porous ion exchange material, which results in the prevention of scale formation.

What is claimed is:

1. An electrodeionization water producing apparatus comprising a depletion chamber packed with an ion exchange material, the depletion chamber being partitioned by a cation exchange membrane on one side and an anion exchange membrane on the other side, and concentrate chambers installed on both sides of the depletion chamber with the cation exchange membrane and the anion exchange membrane disposed inbetween, the depletion chamber and the concentrate chambers disposed between an anode chamber equipped with an anode and a cathode chamber equipped with a cathode, wherein the concentrate chambers are packed with an organic porous cation exchange material has a continuous pore structure comprising interconnected macropores and mesopores with an average diameter of 1 to 1,000 μm existing on the walls of the interconnected macropores.

2. The electrodeionization water producing apparatus according to claim 1, wherein the depletion chamber comprises two small depletion chambers filled with ion exchange material, formed in the spaces partitioned by a cation exchange membrane on one side, an anion exchange membrane on the other side, and an intermediate ion exchange membrane disposed between the cation exchange membrane and the anion exchange membrane.

3. The electrodeionization water producing apparatus according to claim 2, wherein the ion exchange material packed in one of the two small depletion chamber partitioned by the intermediate ion exchange membrane and the anion exchange membrane on said other side is an anion exchange material and the ion exchange material packed in the other small depletion chamber partitioned by the cation exchange membrane on said one side and the intermediate ion exchange membrane is a mixture of a cation exchange material and an anion exchange material.

4. The electrodeionization water producing apparatus according to claim 1, wherein the concentrate chambers are packed with organic porous cation exchange material and organic porous anion exchange material alternately layered in the flow direction of concentrate water, wherein the organic porous cation exchange material has a continuous pore structure comprising interconnected macropores and mesopores with an average diameter of 1 to 1,000 μm existing on the walls of the interconnected macropores and the organic porous anionic exchange material has a continuous pore structure comprising interconnected macropores and mesopores with an average diameter of 1 to 1,000 μm existing on the walls of the interconnected macropores.

5. The electrodeionization water producing apparatus according to claim 1, wherein the organic porous ion exchange materials having a continuous pore structure packed in the concentrate chambers are further provided with passages other than the continuous pores formed from the macropores and mesopores.

6. The electrodeionization water producing apparatus according to claim 1, wherein the organic porous ion exchange materials packed in the concentrate chambers have a total pore volume of 1 to 50 ml/g.

7. The electrodeionization water producing apparatus according to claim 1, wherein the organic porous ion exchange materials packed in the concentrate chambers contain uniformly dispersed ion exchange groups and have an ion exchange capacity of 0.5 mg equivalent/g or more on a dry basis.

8. The electrodeionization water producing apparatus according to claim 1, wherein the concentrate chambers have a thickness of 0.2 to 15 mm.

9. The electrodeionization water producing apparatus according to claim 1, wherein the concentrate chambers have a thickness of 3 to 10 mm.

10. A method of producing deionized water comprising passing direct current between the cathode and anode of the electrodeionization water producing apparatus of claim 1, passing water to be processed through the depletion chamber, concentrate water through the concentrate chambers, and electrode water through the anode chamber and cathode chamber, obtaining from the depletion chamber deionized water with impurity ions removed therefrom, and obtaining from the concentrate chamber concentrate water in which impurity ions are concentrated.

11. The method of producing deionized water according to claim 10, wherein the concentrate chambers are packed with organic porous cation exchange material and organic porous anion exchange material alternately layered in the flow direction of concentrate water, wherein the organic porous cation exchange material has a continuous pore structure comprising interconnected macropores and mesopores with an average diameter of 1 to 1,000 μm existing on the walls of the interconnected macropores and the organic porous anionic exchange material has a continuous pore structure comprising interconnected macropores and mesopores with an average diameter of 1 to 1,000 μm existing on the walls of the interconnected macropores.

12. The method of producing deionized water according to claim 10, wherein the organic porous ion exchange materials having a continuous pore structure packed in the concentrate chambers are further provided with passages other than the continuous pores formed from the macropores and mesopores.

13. The method of producing deionized water according to claim 10, wherein the organic porous ion exchange materials packed in the concentrate chambers have a total pore volume of 1 to 50 ml/g.

14. The method of producing deionized water according to claim 10, wherein the organic porous ion exchange materials packed in the concentrate chambers contain uniformly dispersed ion exchange groups and have an ion exchange capacity of 0.5 mg equivalent/g or more on a dry basis.

15. The method of producing deionized water according to claim 10, wherein the concentrate chamber has a thickness of 0.2 to 15 mm.

16. The method of producing deionized water according to claim 10, wherein the concentrate chamber has a thickness of 3 to 10 mm.

17. A method of producing deionized water comprising passing direct current between the cathode and anode of the electrodeionization water producing apparatus of claim 2, feeding water to be processed to one of the small depletion chambers partitioned by the intermediate ion exchange membrane and the anion exchange membrane on said other side, feeding effluent water from said small depletion chamber to the other small depletion chamber partitioned by the cation exchange membrane on said one side and the intermediate ion exchange membrane, passing concentrate water through the concentrate chambers, passing electrode water through the anode chamber and cathode chamber, obtaining from said other small depletion chamber deionized water with impurity ions removed therefrom, and obtaining from the concentrate chambers concentrate water in which impurity ions are concentrated.

18. The method of producing deionized water according to claim 17, wherein the ion exchange material packed in one of the two small depletion chambers is an anion exchange material and the ion exchange material packed in the other small depletion chamber is a mixture of a cation exchange material and an anion exchange material.

* * * * *